3,271,875
METHOD FOR STABILIZING UNSTABLE
SUBSTANCES
Louis Rey, Les Cerisiers, France, assignor to
l'Air Liquide
No Drawing. Filed May 5, 1965, Ser. No. 453,484
Claims priority, application France, May 11, 1964,
974,006, Patent 1,405,883
9 Claims. (Cl. 34—5)

The invention relates to a method for stabilizing substances which are unstable in the air, and more particularly organic and biological substances, which are stabilized by diluting them in a liquid, cooling the diluted medium until the liquid solidifies, and carrying away or separating out the solidified liquid by selective sublimation.

It is well known that numerous chemical and biological systems are unstable when they are in solution or in the presence of not negligible quantities of liquids. For this reason, they are frequently desiccated in order to ensure their preservation. If they are deprived in this way of their reactive medium, the substances treated can maintain their structure and activity for long periods. Nevertheless, the drying by heating or even at normal ambient temperature changes very often the substance to be preserved to a considerable extent.

It is already known, as exemplarily described in French Patent No. 1,055,841, to stabilize substances in an aqueous environment by a process called lyophilisation, consisting in solidifying the aqueous environment by freezing and eliminating subsequently the ice by selective sublimation under a vacuum. By means of this method, various substances and especially biological substances, may be stabilized and preserved for long periods and can be regenesated to a state closely resembling the original condition, simply by rehydrating. However, this does not ensure the stabilization of substances insoluble in water, and especially lipires, liposoluble vitamins, certain steroids and polymers, whilst, on the other hand, it does not assure the stabilization of substances which are still unstable in the presence of their environment at temperatures at which the selective sublimation of the ice proceeds still with an acceptable velocity, say about −50° C.

There was also proposed to stabilize substances such as steroids, hormones and alcaloids, by dissolving them in an organic solvent of a melting point between about 0° and 25° C., and a boiling point between about 80° and 160° C., for instance dioxane, benzene, dibromoethylene, t-butanol, p-xylene and p-chlorotoluene, then solidifying the solution and carrying away the solvent by vacuum sublimation near ambient temperature.

However the above disclosed process allows to use only a limited number of solvents, and therefore does not allow to submit to the lyophilisation under technically acceptable conditions—especially for the time of the operation—substances which dissolve readily only in very volatile solvents, or substances which are present in a liquid unsublimable at low temperature after freezing, or which become stable only at very low temperatures.

The method of the invention has the object of eliminating these drawbacks and of permitting the stabilization of substances insoluble in water and organic solvents of a melting point higher than 0° C., and of substances which become stable in the presence of their environment only at very low temperatures or, say, less than −100° C.

This object is achieved according to the invention in that there is used as a diluting liquid body at least a compound of the group consisting of ammonia, carbon dioxide, and the halogenated hydrocarbons and the aliphatic amines of a melting point substantially lower than 0° C.

The method comprises also the following features, either jointly or separately:

(a) The liquid is a solvent for the substances to be stabilized;
(b) The diluting liquid ammonia, and its selective sublimation is effected under a vacuum and below −100° C.;
(c) The diluting liquid is liquid carbon dioxide and its selective sublimation is effected near atmospheric pressure at about −80° C.;
(d) The diluting liquid is carbon tetrachloride, and its selective sublimation is effected at about −55° C.;
(e) If the substance is in the presence of a liquid which cannot be sublimated after freezing, this liquid is displaced by an easily sublimated liquid;
(f) If it is desired to stabilize a substance which is present in low concentratios in its original environment, a third substance which is not sublimate with this liquid solvent is added, and especially glycol distearate in the case of a liposoluble substance.

The invention will be further described, by way of example and in a non-limitative manner, with reference to several examples for stabilizing substances in a non-aqueous environment.

The experiments were carried out with a laboratory apparatus constructed from glass and comprizing, in addition, a drying chamber and a condenser cooled by liquid nitrogen, the assembly being evacuated by a vane pump. Different measuring and control members permit, once the frozen product has been placed into the chamber and the apparatus has been evacuated, the control of the temperature of the specimen and the monitoring of the sublimation.

(A) STABILIZATION BY CRYODESICCATION OF SOLUTIONS IN LIQUID AMMONIA

Its remarkable properties make liquid ammonia an exceptional solvent and render its behaviour very similar to that of water. In fact, liquid ammonia dissolves not only numerous organic substances, but also mineral salts which can undergo here ionic dissociation. There exist therefore ammoniolytic reactions, since liquid ammonia contains $NH_2^-$ and $H^+$ ions susceptible to react with the solutes. Finally, many reactions take place only in liquid ammonia (e.g., metal-ammonia reactions). The lyophilisation is therefore the ideal means to permit the isolation and separation of the supplied compounds of which certain ones are highly unstable.

Ammonia solidified in liquid nitrogen has a progressive melting point at about −77.5° C.

Various bodies dissolved in liquid ammonia change their behaviour. Thus, in the presence of 1-lysine, the starting melting temperature is lowered to −85° C. for a concentration of 10%. According to the preceding indications, the lyophilisation of the solutions in liquid ammonia must be effected at very low temperatures.

*The case of 10% 1-lysine solution*

The product is first frozen at −196° C., then placed in the vessel which is hermetically sealed and evacuated.

The pressure is reduced to 3.5 millibars in less than 10 minutes and then remains near 2.5 millibars until the end of the operation.

The product is slowly heated and the sublimation starts towards −130° C. and becomes intensive at −110° C. The temperature must then be monitored very closely and maintained constantly below −100° C. and preferably near −110° C. In fact, if it rises, the product melts in the vacuum and the operation is jeopardized. The sublimation of a layer of 7–8 mm. takes about 7 to 8 hours. If the desiccation phase is included, the operation takes about 20 hours.

The final product is available in the form of white tablets which are slightly drawn in and concave, and often broken by shrinkage cracks. The consistence is good although very light and finely porous. It crushes nevertheless easily and dissolves immediately in ammonia or in water.

The lyophilisations in liquid ammonia are interesting from several points of view.

Liquid ammonia is a particular solvent and makes it possible to prepare in dry and stable condition various products which cannot be otherwise prepared. Ammonia may also eliminate undesirable bodies which counteract the lyophilisation under normal conditions. Thus it is not generally possible to study morphologically the fine structure of tissues frozen in the presence of glycerol. In fact, glycerol is not removed during the lyophilisation and is preserved so that at the end of the operation the now soft tissue is submerged in concentrated glycerol. In order to overcome this undesirable drawback, the glycerol may be extracted from the frozen tissue by submerging it for a few minutes in liquid ammonia at −75° C. The ice crystals are also dissolved. It is therefore possible to freeze the tissue at −196° C. and to lyophilise the liquid ammonia. Finally, there results a perfectly dry and morphologically perfect specimen.

The liquid ammonia is a particularly reactive environment in which new and often unstable chemical species can be formed. The lyophilisation offers the means for stabilizing and studing them. It furnishes a method for additional work in chemical research.

Lyophilisations in liquid ammonia may be effected at very low temperatures (−110° C.) and this makes possible in some cases the preparation and isolation of very unstable and highly reactive products.

(B) STABILIZATION OF SOLUTIONS OF LIPIDES OR SUBSTANCES ASSIMILATED IN CARBON TETRACHLORIDE BY VERY LOW TEMPERATURE DRYING

Carbon tetrachloride $CCl_4$ is a good solvent for fats and may be used for their lyophilisation.

$CCl_4$ is easily solidified and yields a firm vitreous mass which fractures at low temperature after the manner of glycerol. Under progressive heating is shown an important vitreous transformation towards −50° C., then seems to recrystallize between −48° C. and −30° C. and melts finally suddenly at −23° C. This behavour is perfectly reversible and is not changed by thermal treatment.

Solutions in $CCl_4$ have generally a similar behaviour and are sublimated in a similar manner to the pure solvent, that is to say, from −80° C. and especially towards −55° C.

*Research of a "charge" substance*

With a view to render lyophilic very small quantities of active substances, a "charge substance" was required suitable to act after the manner of glycocolle, dextran or albumin with aqueous systems, that is, to facilitate the formation of a homogenous and solid pill. Glycol distearate, the 7½% solution of which in carbon tetrachloride is easily lyophilised between −80 and −30° C. and yields a light and consistent solid, has been shown to be perfectly suitable for this purpose.

In this manner it is possible to lyophilise a vitaminized animal oil in concentrations of 1% by adding 7½% glycol distearate as support.

The preceding examples are merely indicative and do not limit the invention. In the same manner it is possible to treat many systems containing one of more liquids other than water.

Thus it is possible to lyophilise solutions in dimethyl amine near −60° C., in methyl amine near −100° C., in carbon dioxide near −80° C. (near atmospheric pressure).

What I claim is:

1. A method for stabilizing substances alterable in the air, comprising the steps of diluting them in a liquid, cooling the diluted medium until the liquid solidifies, and separating out the solidified liquid by selective sublimation, the diluting liquid being at least a compound of the group consisting essentially of ammonia and carbon dioxide, and the halogenated hydrocarbons and the aliphatic amines of a freezing point substantially under 0° C.

2. A method according to claim 1, wherein the diluting liquid is a solvent of the substance to be stabilized.

3. A method according to claim 1, wherein the diluting liquid is liquid ammonia, having its selective sublimation being effected under −100° C.

4. A method according to claim 1, wherein the diluting liquid is liquid carbon dioxide, having its selective sublimation being effected under about atmospheric pressure at about −80° C.

5. A method according to claim 1, wherein the diluting liquid is carbon tetrachloride, and wherein its selective sublimation is effected at about −55° C.

6. A method according to claim 1, wherein the substance to be stabilized is in the presence of a non-sublimable liquid after solidification, the non-sublimable liquid being displaced by an easily sublimable solvent before the solidification by cooling.

7. A method according to claim 1, wherein the substance to be stabilized is present in a small amount in its initial diluting liquid, another substance being added to the initial medium which is not sublimable with the diluting liquid.

8. A process according to claim 7, wherein the substance to be stabliized is liposoluble, and wherein said other subtsance is glycol distearate.

9. A method for stabilizing substances alterable in the air, consisting of the steps of diluting them in a liquid medium, cooling the diluting medium until the liquid solidifies, and separating out the solidified liquid by selective sublimation, the diluting liquid body being any other compound than water, dioxane, benzene, dibromoethylene, t-butanol, p-xylene and p-chlorotoluene.

References Cited by the Examiner
UNITED STATES PATENTS

| | | | |
|---|---|---|---|
| 1,979,124 | 10/1934 | Tival | 34—5 |
| 2,659,986 | 11/1953 | Hink | 34—5 |
| 2,731,731 | 1/1956 | Hink | 34—5 |
| 2,836,368 | 5/1958 | McCoy | 34—5 |

WILLIAM J. WYE, *Primary Examiner.*